United States Patent Office
3,467,678
Patented Sept. 16, 1969

3,467,678
TETRAHYDROPYRANYL AND TETRAHYDROFUR-
ANYL ETHERS OF GRISEOFULVIN AND DERIV-
ATIVES THEREOF
John A. Edwards, Los Altos, Calif., assignor to Syntex
Corporation, Panama, Panama, a corporation of
Panama
No Drawing. Filed July 14, 1966, Ser. No. 565,113
Int. Cl. C07d 5/36, 7/04, 5/04
U.S. Cl. 260—345.9                                    10 Claims

ABSTRACT OF THE DISCLOSURE

Tetrahydrofuranyl and tetrahydropyranyl ethers of griseofulvin and derivatives thereof are used to treat dermatophytic infections.

This invention pertains to new and novel benzofuran spiro cyclohexenes and a process for their preparation.

More specifically this invention relates to the tetrahydropyranyl and tetrahydrofuranyl ethers of benzofuran spiro cyclohexenes and a process for making the same In particular, the present invention relates to compounds of the formula:

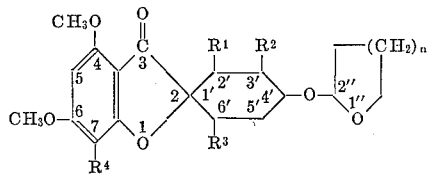

wherein $R^1$ is hydrogen, hydroxy, or lower alkoxy; $R^2$ is hydrogen, chloro, bromo, iodo, or lower alkyl; $R^3$ is hydrogen or $\beta$-methyl; $R^4$ is hydrogen, fluoro, chloro, or bromo; and $n$ is a positive real integer of the value 1 or 2.

For purposes of the present invention, the 4'-hydroxy-benzofuran spiro cyclohexenes are 2,3-dihydro-3-keto-4,6-dimethoxybenzofuran - 2 - spiro - 1' - cyclohex - 2' - en-4'-ols compounds substituted at the 7, 2', 3' and 6' positions. By the term alkyl it is meant those groups that are hydrocarbon alkyls of less than 12 carbon atoms which are straight or branched chains. They can be optionally substituted with such groups as lower alkoxy of less than 5 carbon atoms, cyclic alkyl of 4 to 6 carbon atoms, aromatic groups (e.g., phenyl), halogeno, amino, hydroxy, and so forth. Typical examples include methyl, ethyl, propyl, benzyl, and the like. By the term alkoxy it is meant those groups that are hydrocarbon alkyl ethers, where the alkyl portion is as defined above. Typical alkoxys include methoxy, ethoxy, propoxy, butoxy, and the like.

Compounds of the present invention are effective fungicides both in vitro and in vivo. They can be applied topically to combat dermatophytic infections, or, with even greater effectiveness, they can be administered orally. Topically the compounds of the present invention are applied in a variety of forms, such as a salve, powder, solution, liquid suspension, spray, and the like. Orally, it can be administered as a pellet, pill, capsule, solution, liquid suspension, syrup, etc. The oral dosage varies from about 5 mg. to about 35 mg. per kilogram of body weight, depending upon the type of infection, location of infection, severity of infection, and so forth.

Compounds of the present invention are also fungicidal in treating fungi infections of plants. In the treatment of plants, the compounds are applied topically to the infected area either as a solid, e.g., powers, or as a liquid, e.g., solutions, sprays, aerosols.

The compounds of the present invention are prepared by treating the appropriate 4' - hydroxybenzofuran spiro cyclohexene with at least a molar equivalent of dihydropyran, preferably a 5 molar to about a 100 molar excess, in the presence of a catalytic amount of a sulfonyl halide, as for example, from about 0.001 to about 0.1 molar equivalents of sulfonyl halide per molar equivalent of dihydfropyran. Any stable aryl sulfonyl halide may be used as a catalyst, such as p-toluenesulfonyl chloride, p-nitrobenzenesulfonyl chloride, benzene sulfonyl chloride and the like.

The process is preferably carried out at temperatures ranging from between 10° C. and 40° C. for a period of time on the order of about 1 hour to about 48 hours. However, lower or higher reaction temperatures and longer reaction times are not detrimental to the process. The ultimate reaction temperature and period will depend upon various factors, such as the amount of dihydropyran used, the type and amount of solvent used, the particular starting material used, and so forth.

Optionally, a non-aqeuous, inert, organic solvent, such as diethyl ether, tetrahydrofuran, dioxane, diglyme, benzene, cyclohexane, n-heptane, and the like, can be used in conjunction with the dihydropyran in amounts of about one-half to about twice the volume of dihydropyran used. Lesser or larger amounts of solvent can be used, and in fact, the process can be practiced without the use of any solvent.

Due to the limited solubility of benzofuran spiro cyclohexenes in dihydropyran and in organic solvents, substantial volumes of both dihydropyran and solvent are required to dissolve a given weight of a 4'-hydroxybenzofuran spiro cyclohexene. Depending on the solvent used, the ratio of solvent to dihydrofuran, the reaction temperature, and so forth, at least a 10 ml. combined volume of dihydropyran and solvent are required to dissolve 1 g. of a 4'-hydroxybenzofuran spiro cyclohexene.

The 4'-(tetrahydrofuran-2-yl) ethers of benzofuran spiro cyclohexenes are prepared in the same manner as the 4'-(tetrahydropyran-2-yl) ethers, except dihydropyran is replaced with dihydrofuran in the process.

The resulting tetrahydropyranyl or tetrahydrofuranyl ether of the benzofuran spiro cyclohexene is then isolated and purified by conventional techniques. For example, after the reaction, the reaction mixture is poured into an aqueous solution containing an excess of base, such as sodium bicarbonate, potassium carbonate, and the like. The resulting mixture is reduced to about one-half of its original volume by evaporation and the crystalline material that crystallizes out is collected by filtration and washed with water to neutrality and dried to yield the ether. The product may be further purified by chromatography or crystallization, if desired.

Particularly preferred compounds of the present invention are 2,3 - dihydro - 3 - keto - 4,6 - dimethoxybenzofuran - 2 - spiro - 1' - cyclohex-2'-ene compounds wherein the 2' position is substituted with hydrogen, methoxy, ethoxy, propoxy or butoxy, the 3' position is substituted with hydrogen, benzyl, chloro, bromo or iodo, the 6' position with hydrogen or $\beta'$-methyl, and the 7 position with hydrogen, fluoro, chloro or bromo.

Typical suitable starting materials for the process of the present invention include 2,3-dihydro-3-keto-7-chloro-4,6-dimethoxybenzofuran-2-
    spiro-1'-cyclohex-2'-ene-2'-methoxy-6'$\beta$-methyl-4'-ol;
2,3-dihydro-3-keto-4,6-dimethoxy-7-chlorobenzofuran-2-
    spiro-1'-cyclohex-2'-ene-2'-propoxy-6'$\beta$-methyl-4'-ol;
2,3-dihydro-3-keto-4,6-dimethoxy-7-chlorobenzofuran-2-
    spiro-1'-cyclohex-2'-ene-2'-propoxy-3'-benzyl-6'$\beta$-
    methyl-4'-ol;

2,3-dihydro-3-keto-4,6-dimethoxy-7-bromobenzofuran-2-spiro-1'-cyclohex-2'-ene-2-'methoxy-6'β-methyl-4'-ol;

2,3-dihydro-3-keto-4,6-dimethoxy-7-chlorobenzofuran-2-spiro-1'-cyclohex-2'-ene-2'-butoxy-3'-iodo-6'β-methyl-4'-ol;

and so forth.

The starting materials are produced from 4'-ketobenzofuran spiro cyclohexenes, substituted at the 7, 2', 3' and 6' positions by a reduction of the 4'-keto group to a hydroxy group. One method of reduction is carried out by treating the compound with a slight molar excess of sodium borohydride in sufficient quantities of methanol to dissolve the product. The mixture is allowed to stand for a day or two, and then a dilute acidic solution, such as in hydrochloric acid, and water are added to decompose the excess hydride. The total mixture volume is reduced to about one-half by evaporation under reduced pressure and the product subsequently crystallizes out. The resulting 4'-hydroxybenzofuran spiro cyclohexene can be recrystallized from methanol, if desired.

In order that those skilled in the art might more fully understand the present invention, the following examples are included as illustrations. In no way should these examples be construed as limitations of the present invention.

PREPARATION 1

To a solution consisting of 3.0 liters of absolute methanol and 35.3 g. of Griseofulvin (2,3 - dihydro - 3 - keto-4,6 - dimethoxy - 7 - chlorobenzofuran - 2 - spiro-1'-cyclohex - 2' - ene - 2' - methoxy - 6'β - methyl - 4' - one) are added 7.5 g. of sodium borohydride. The reaction mixture is gently stirred for 48 hours under dry conditions at room temperature; then, 1,650 ml. of water are added together with a sufficient quantity of aqueous 2 N sulfuric acid to make the resulting mixture slightly acidic, e.g., equivalent to a pH of 6. The mixture is reduced to half of its volume by evaporation under reduced pressure. The mixture is allowed to stand until the product crystallizes out. The crystals are collected by filtration, washed with water to neutrality, and then dried. The resulting 2,3 - dihydro - 3 - keto - 4,6 - dimethoxy - 7-chlorobenzofuran - 2 - spiro - 1' - cyclohex - 2' - ene - 2'-6'β-methyl-4'-ol is recrystallized from 355 ml. of methanol.

By following the same method, other 4' - hydroxybenzofuran spiro cyclohexenes can be produced from the corresponding 4'-ketobenzofuran spiro cyclohexene. For example, 2,3 - dihydro - 3 - keto - 4,6 - dimethoxy-7-chlorobenzofuran - 2 - spiro - 1' - cyclohex - 2' - ene-2'-butoxy-6'β-methyl-4'-ol is produced from 2,3 - dihydro-3 - keto - 4,6 - dimethoxy - 7 - chlorobenzofuran-2-spiro-1'-cyclohex-2'-ene-2'-butoxy-6'β-methyl-4'-one.

EXAMPLE 1

To a solution consisting of 250 g. of dihydropyran, 250 ml. of tetrahydrofuran, and 1.0 g. of p-toluenesulfonyl chloride, are added 10 g. of 2,3 - dihydro - 3 - keto-4,6 - dimethoxy - 7 - chlorobenzofuran - 2 - spiro - 1'-cyclohex-2'-ene-2'-methoxy-6'β-methyl-4'-ol. The mixture is stirred at room temperature under dry conditions for 48 hours. The mixture is added to 500 ml. of an aqueous 2% sodium bicarbonate solution. The product is extracted with 2 liters of methylene chloride and the extract is washed with water to neutrality and evaporated to dryness. The resulting 2,3 - dihydro - 3 - keto - 4,6 - dimethoxy - 7 - chlorobenzofuran - 2 - spiro - 1' - cyclohex-2'-ene - 2' - methoxy - 6'β - methyl - 4' - (tetrahydropyran-2''-yloxy) is recrystallized from methanol.

EXAMPLE 2

By practicing the procedure above and replacing dihydropyran with dihydrofuran, 2,3 - dihydro - 3 - keto-4,6-dimethoxy - 7 - chlorobenzofuran - 2 - spiro - 1' - cyclohex - 2' - ene - 2' - methoxy - 6'β - methyl - 4' - (tetrahydrofuran-2''-yloxy) is produced.

EXAMPLE 3

Five grams of 2,3 - dihydro - 3 - keto - 4,6 - dimethoxy-7 - chlorobenzofuran - 2 - spiro - 1' - cyclohex - 2' - ene-2' - butoxy - 3' - benzyl - 6'β - methyl-4'-ol are added to a solution consisting of 140 ml. of diglyme, 68 g. of dihydropyran, and 100 mg. of p-toluenesulfonyl chloride. The resulting mixture is stirred for 4 days at room temperature under dry conditions. Five-hundred milliliters of an aqueous 1% sodium bicarbonate solution are added and the resulting solution is evaporated to one-third of its original volume under reduced pressure at 35° C. The crystalline material, that collects for 2 days, is filtered off and washed with water to neutrality yielding 2,3-dihydro - 3 - keto - 4,6 - dimethoxy - 7 - chlorobenzofuran-2 - spiro - 1' - cyclohex - 2' - ene - 2' - butoxy - 3' - benzyl-6'β-methyl - 4' (tetrahydropyran - 2'' - yloxy). The product is crystallized from methanol.

EXAMPLE 4

By the process of Example 3, the following converted into the corresponding 4' - (tetrahydropyran-2''-yloxy) compounds:

2,3-dihydro-3-keto-4,6-dimethoxy-7-chlorobenzofuran-2-spiro-1'-cyclohex-2'-en-2'-ethoxy-6'β-methyl-4'-ol;

2,3-dihydro-3-keto-4,6-dimethoxy-7-chlorobenzofuran-2-spiro-1'-cyclohex-2'-ene-2'-propoxy-3'-iodo-6'β-methyl-4'-ol;

2,3-dihydro-3-keto-4,6-dimethoxy-7-chlorobenzofuran-2-spiro-1'-cyclohex-2'-ene-2'-propoxy-3'-chloro-6'β-methyl-4'-ol;

2,3-dihydro-3-keto-4,6-dimethoxy-7-chlorobenzofuran-2-spiro-1'-cyclohex-2'-ene-2'-butoxy-3'-bromo-6'β-methyl-4'-ol;

2,3-dihydro-3-keto-4,6-dimethoxy-7-fluorobenzofuran-2-spiro-1'-cyclohex-2'-ene-2'-methoxy-6'β-methyl-4'-ol;

2,3-dihydro-3-keto-4,6-dimethoxy-7-chlorobenzofuran-2-spiro-1'-cyclohex-2'-ene-2'-methoxy-4'-ol;

2,3-dihydro-3-keto-4,6-dimethoxybenzofuran-2-spiro-1'-cyclohex-2'-ene-2'-methoxy-6'β-methyl-4'-ol.

EXAMPLE 5

By treating the starting materials of Example 3 and 4 in the manner of Example 3, and replacing dihydropyran with dihydrofuran, the corresponding 4' - (tetrahydrofuran-2''-yloxy) compounds are produced.

What is claimed is:

1. Compounds of the formula

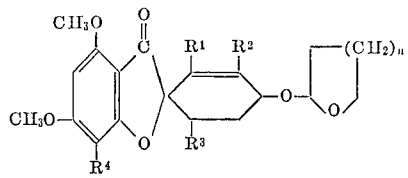

wherein:

$R^1$ is hydrogen, hydroxy, or alkoxy;

$R^2$ is hydrogen, chloro, bromo, or iodo;

$R^3$ is β-methyl;

$R^4$ is fluoro, chloro, or bromo; and $n$ is a positive real integer of the value of 1 or 2.

2. Compounds according to claim 1 wherein:

$R^1$ is alkoxy;

$R^2$ is hydrogen, chloro, bromo, or iodo;

$R^3$ is β-methyl;

$R^4$ is fluoro, chloro, or bromo; and $n$ is a positive real integer of the value of 1 to 2.

3. Compounds according to claim 2 wherein:
$R^4$ is chloro.
4. A compound according to claim 3 wherein:
$R^1$ is methoxy;
$R^2$ is hydrogen; and
$n$ is a positive real integer of the value 1.
5. A compound according to claim 3 wherein:
$R^1$ is methoxy;
$R^2$ is hydrogen; and
$n$ is a positive real integer of the value 2.
6. Compounds according to claim 2 wherein:
$R^1$ is propoxy; and
$R^2$ is hydrogen.
7. Compounds according to claim 3 wherein:
$R^1$ is propoxy; and
$R^2$ is benzyl.
8. Compounds according to claim 2 wherein:
$R^1$ is propoxy; and
$R^2$ is iodo.
9. Compounds according to claim 3 wherein:
$R^1$ is propoxy; and
$R^2$ is chloro.
10. Compounds according to claim 3 wherein:
$R^1$ is butoxy; and
$R^2$ is bromo.

References Cited

UNITED STATES PATENTS

| | | | |
|---|---|---|---|
| 3,113,970 | 12/1963 | Slates et al. | 260—346.2 |
| 3,128,286 | 4/1964 | Walker et al. | 260—346.2 |
| 3,147,282 | 9/1964 | Slates et al. | 260—346.2 |
| 3,392,175 | 7/1968 | Lassman | 260—346.2 |

OTHER REFERENCES

Jour. Gen. Microbiol, vol. 34 (1964), pp. 51–65.

NORMA S. MILESTONE, Primary Examiner

U.S. Cl. X.R.

260—346.2, 999

UNITED STATES PATENT OFFICE
CERTIFICATE OF CORRECTION

Patent No. 3,467,678          Dated September 16, 1969

Inventor(s) John A. Edwards

It is certified that error appears in the above-identified patent and that said Letters Patent are hereby corrected as shown below:

Column 1, lines 25 to 35, the depicted formula should be as follows:

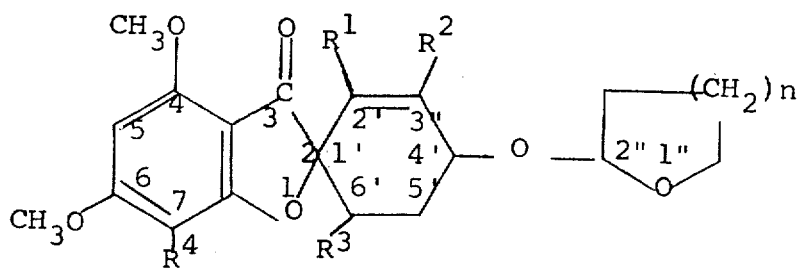

Column 5, line 11, (Claim 6, line 1), "2" should read --3--.

Column 5, line 17, (Claim 8, line 1), "2" should read --3--.

SIGNED AND SEALED
JAN 27 1970

(SEAL)
Attest:

Edward M. Fletcher, Jr.
Attesting Officer

WILLIAM E. SCHUYLER, JR.
Commissioner of Patents